United States Patent [19]

Jaggars

[11] 4,219,039
[45] Aug. 26, 1980

[54] MULTIVARIABLE ANTI-G VALVE

[75] Inventor: Jamy L. Jaggars, San Antonio, Tex.

[73] Assignee: The United States of America as represented by the Secretary of the Air Force, Washington, D.C.

[21] Appl. No.: 949,188

[22] Filed: Oct. 6, 1978

[51] Int. Cl.³ ............................................. F16K 17/36
[52] U.S. Cl. ..................................... 137/38; 128/1 A; 137/81.1
[58] Field of Search .................. 128/1 A; 137/38, 39, 137/81

[56] References Cited

U.S. PATENT DOCUMENTS

| | | | |
|---|---|---|---|
| 2,509,295 | 5/1950 | Glass | 137/85 X |
| 2,820,452 | 1/1958 | Gregg | 128/1 A |
| 3,586,027 | 6/1971 | Fitzgerald | 137/87 |
| 3,780,723 | 12/1973 | Van Patten | 128/1 A |

Primary Examiner—Robert G. Nilson
Attorney, Agent, or Firm—Joseph E. Rusz; Robert Kern Duncan

[57] ABSTRACT

An anti-G valve and control system for providing a multivariable, multi-profile, pressurization of aircrew anti-G garments are disclosed. The ramp characteristic, the ramp onset level, a step onset, the step level, a limit pressure, are all controllable over the normal operating range. In addition, an optional ready pressure control is provided to just fill the anti-G suit volume and greatly decrease inflation time required to reach higher pressures.

2 Claims, 10 Drawing Figures

PRIOR ART

MULTIVARIABLE ANTI-G VALVE

RIGHTS OF THE GOVERNMENT

The invention described herein may be manufactured and used by or for the Government of the United States for all governmental purposes without the payment of any royalty.

BACKGROUND OF THE INVENTION

The field of the invention is in the biomedical human environment art.

The use of pressurized suits in low pressure and in high gravitational force environments to protect the human body is well known. The conventional prior art means for controlling the pressure in a pressure suit has been with a conventional anti-G valve, such as an Alar type MS24350-1, schematically illustrated in FIG. 1. As illustrated in FIG. 2, the conventional pressurizing system using a conventional valve has only one inflation schedule. When the conventional valve having lower body 11 and upper spring chamber 19 is oriented as shown an increase in $+G_Z$ force 12 will cause the mass 13 to descend, so that the rubber seat 14 will cover and depress the pilot port 15 and provide for air to flow from the inlet port 16 to the outlet port 17 until the pressure at the outlet port 17 balances the pressure of the mass 13 that is being acted upon by the gravitation force 12. Thus, the pressure in an anti-G garment is substantially proportional to $+G_Z$. When the acceleration decreases, the valve action reverses and allows excess pressure to escape. FIG. 2 illustrates graphically an inflation schedule 21 of a typical anti-G valve such as the type MS24350-1. It may be noted that normally it doesn't come on, that is the rubber seat 14 is not moved down into contact with port 15, until a +G force of approximately 2.2 acts on mass 13 sufficiently compressing spring 18. This is shown at point 22 on curve 21 of FIG. 2. The rate of air pressure into the pressure garment per unit of G force is approximately 1.5 pound per square inch per gravitational unit after turn on. This is commonly referred to as the ramp characteristic of the valve.

The best known prior art is that contained by the following patents. U.S. Pat. No. 2,509,295 to patentee Glass; U.S. Pat. No. 2,812,481 to patentee Roosdorp; and U.S. Pat. No. 3,586,027 to patentees Fitzgerald, Jr., et al.

SUMMARY OF THE INVENTION

The invention provides an improved anti-G valve and control system that is responsive to changes in acceleration and pressure to provide substantially an infinite number of inflation schedules to pressurized equipment, such as aircraft personnel inflation suits.

DESCRIPTION OF THE PREFERRED EMBODIMENT

Figure 1:
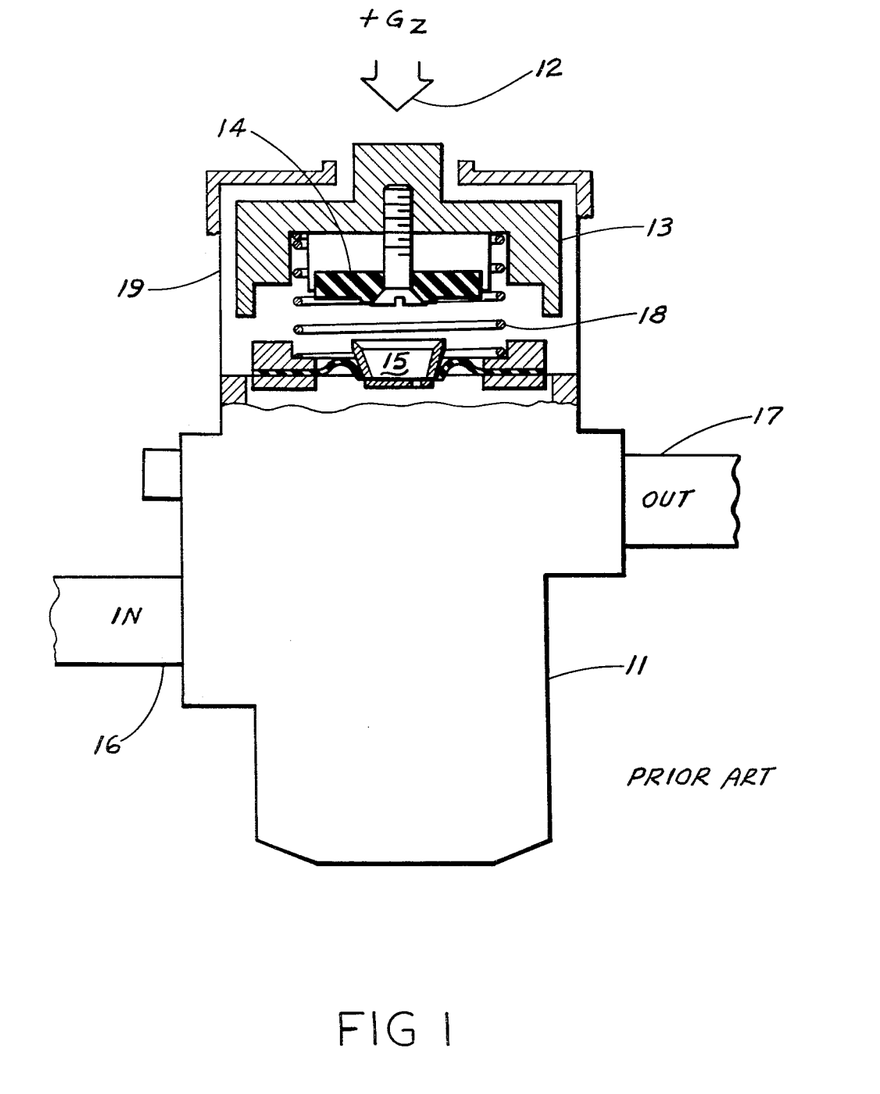
FIG. 1 schematically illustrates a typical prior art anti-G valve.
Figure 2:
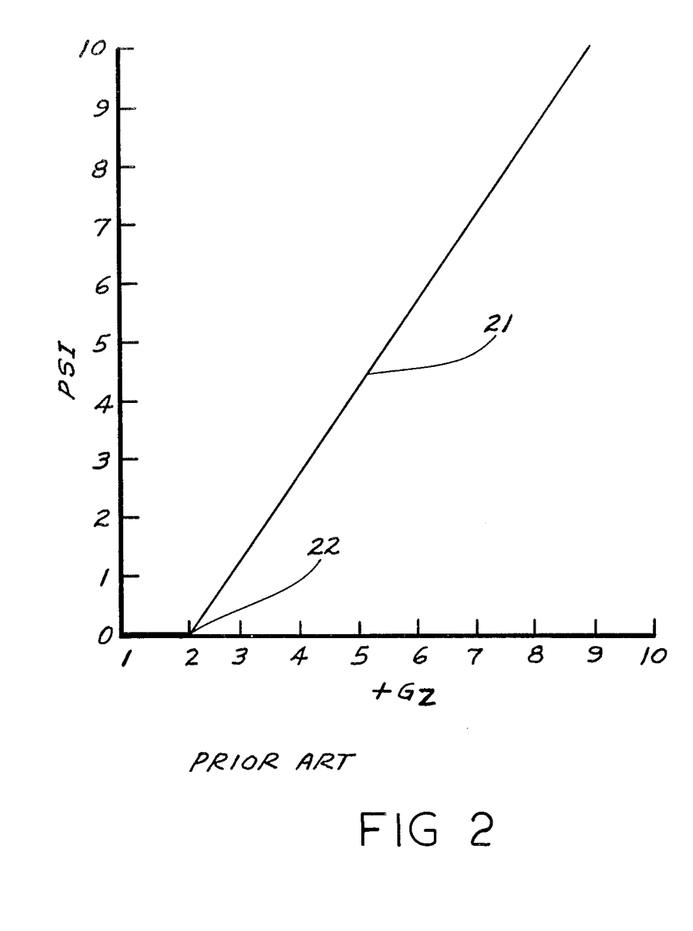
FIG. 2 illustrates a typical prior art anti-G valve response characteristic curve.
Figure 3:
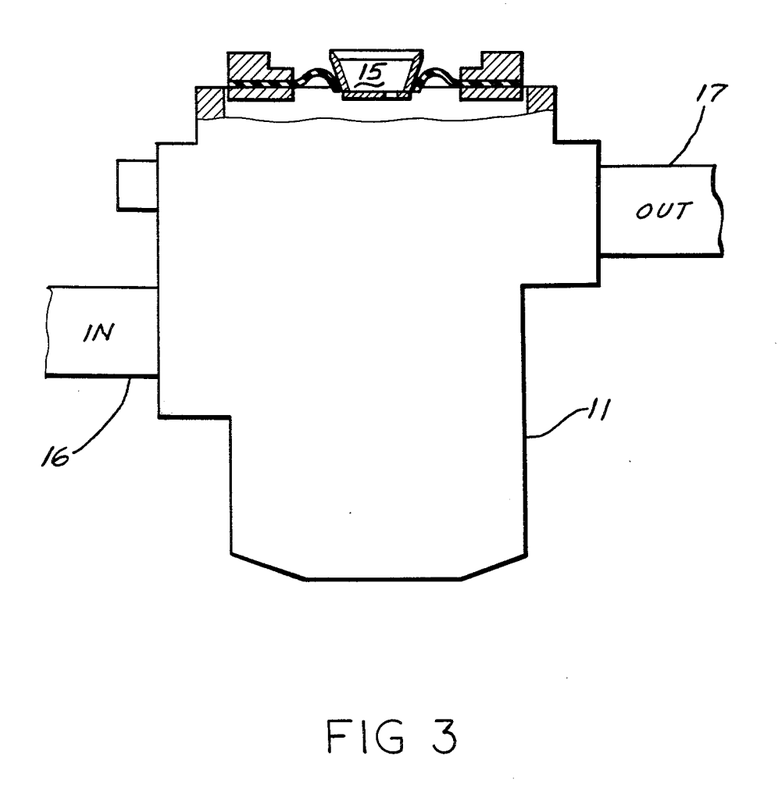
FIG. 3 schematically illustrates the lower portion of a conventional anti-G valve.
Figure 4:
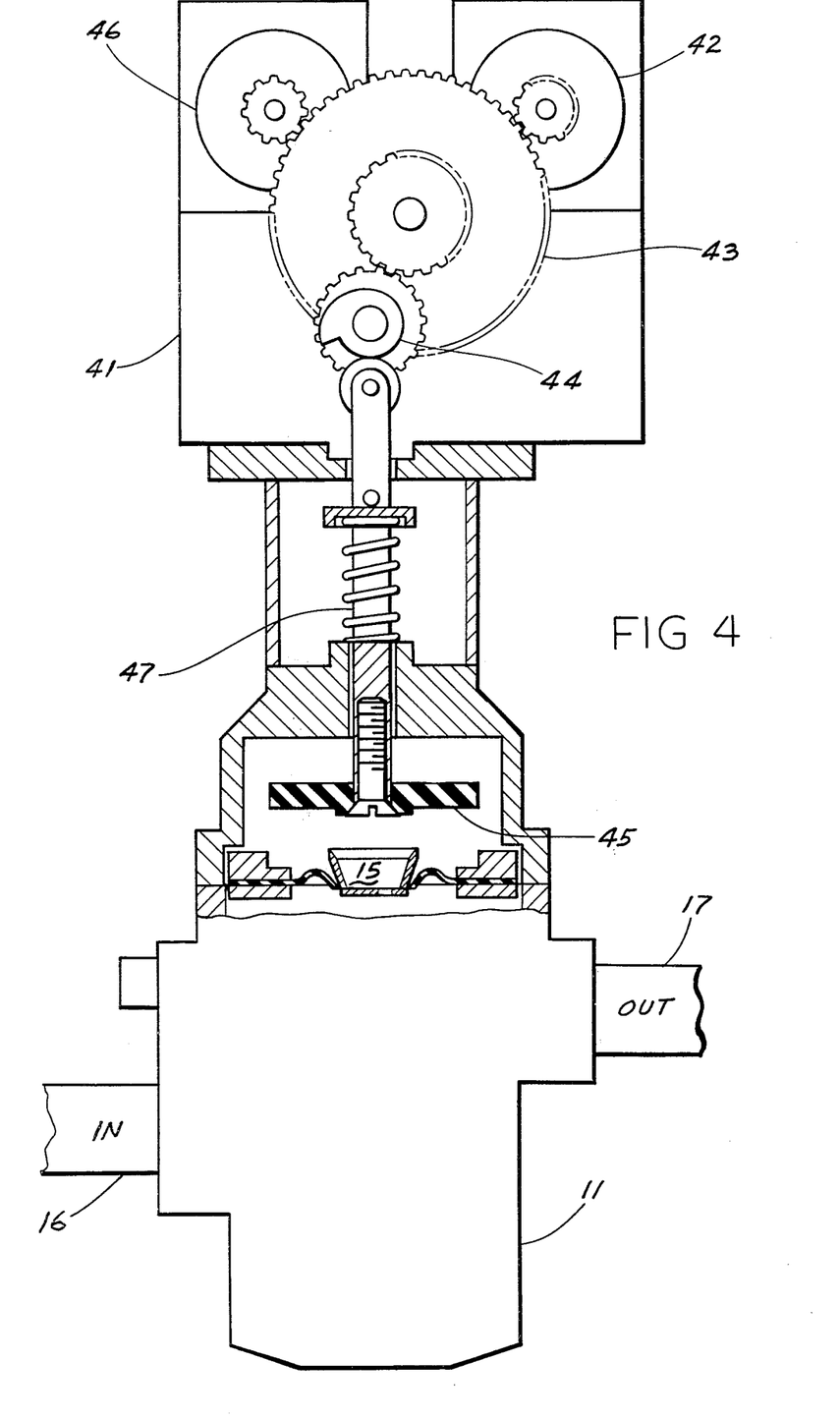
FIG. 4 schematically illustrates the cooperation of the servo drive mechanism with the conventional valve body.

The prior art mass controlled anti-G valve as illustrated in FIG. 1 and having the characteristics illustrated in FIG. 2 is modified by removing the upper spring chamber 19 as shown schematically in FIG. 3. In place of the upper chamber 19 (FIG. 1), a servo control, motor actuated, valve operating system 41, as illustrated in FIG. 4, is attached to the conventional lower body 11. The motor 42, through reduction gear train 43, drives the cam 44 causing the seat 45 to cover and depress the pilot port 15 as the mass-spring combination 13 and 18 did in the conventional device. (The air flow through the lower body 11 is the same in embodiments of the invention as in the prior art system, only controlled through movement of pilot port 15 in a new and unique manner.) A second motor 46 is driven by motor 42 and functions as a closed-loop motor-driven servo system.

Figure 5A:
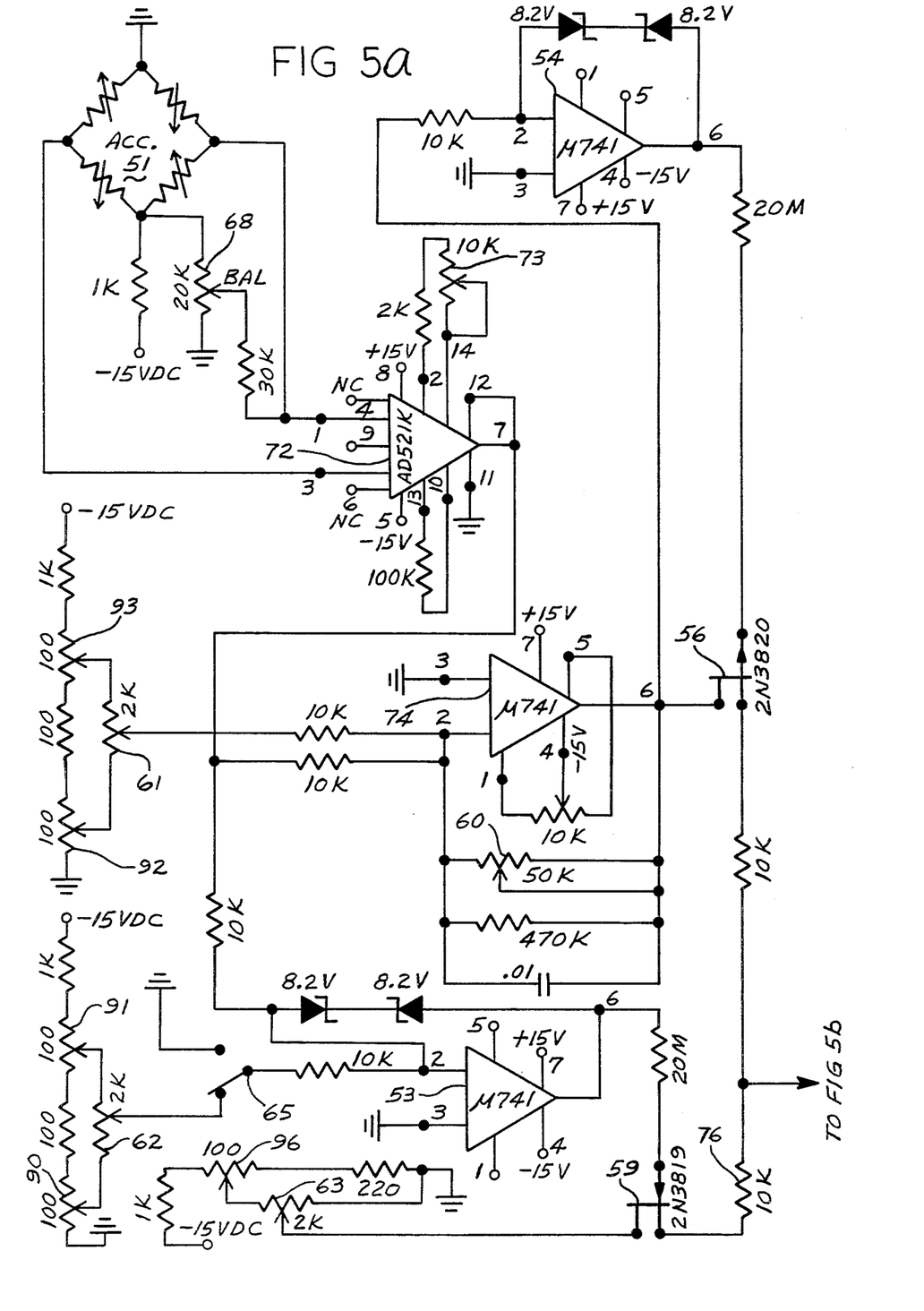
FIGS. 5a, 5b, and 5c comprise a schematic electronic diagram illustrating a typical electronic control system.
Figure 5B:
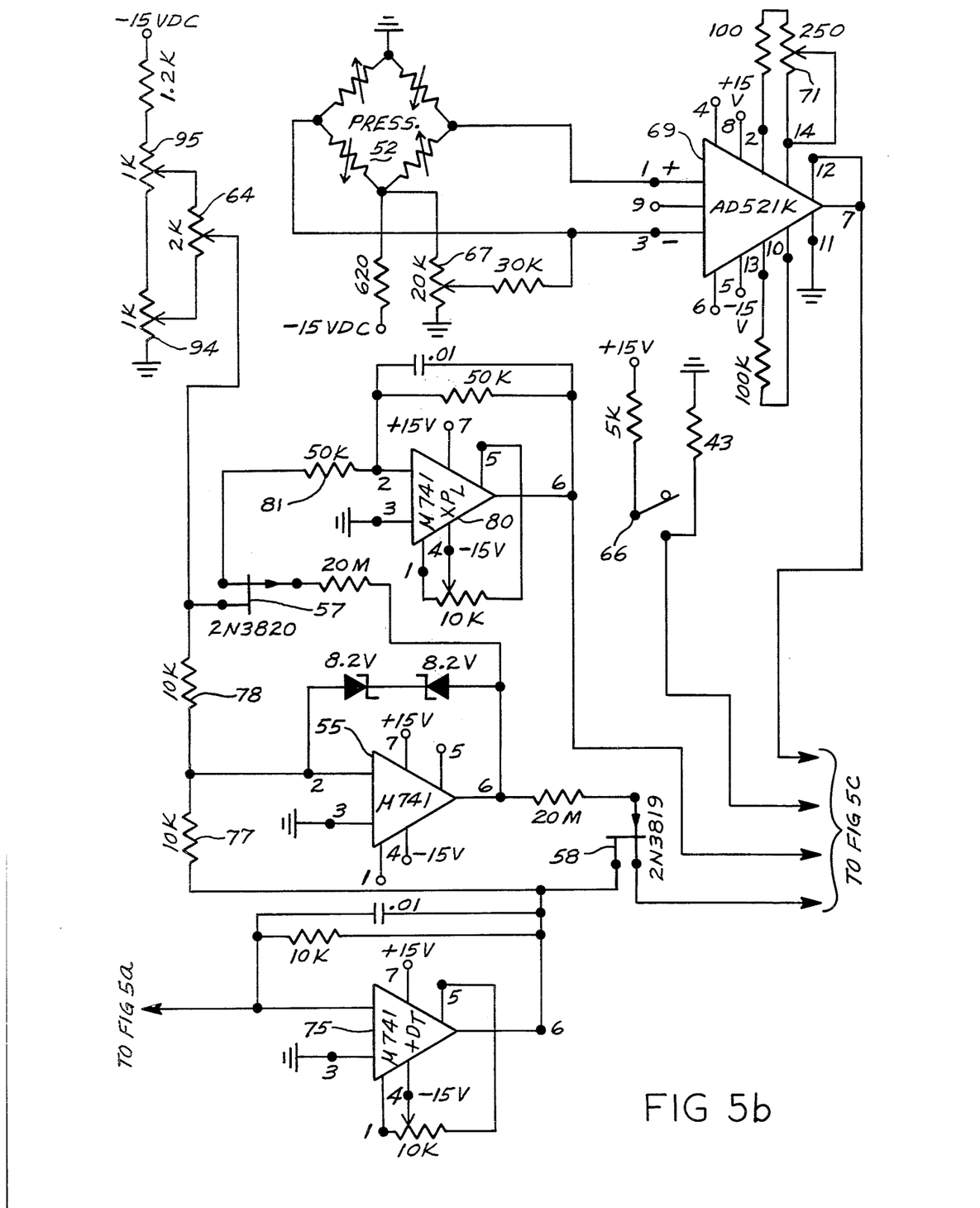
Figure 5C:
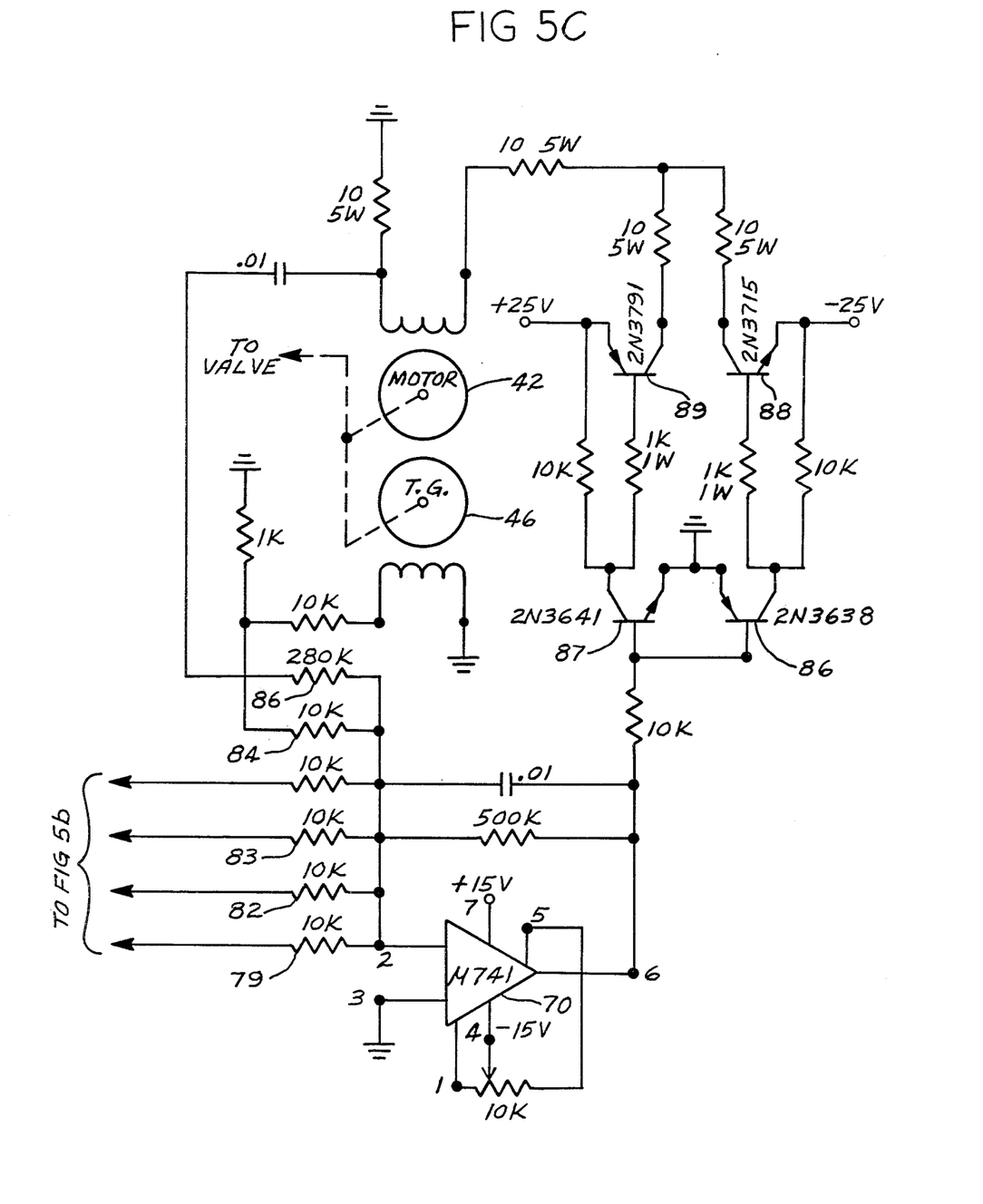

The motor 42 is actuated in response to a conventional accelerometer transducer 51 and a conventional pressure transducer 52 through an electronic control circuit as illustrated in FIGS. 5a, 5b, and 5c. Amplifiers 53, 54, and 55 are zero crossing detectors and have two discrete states at their outputs, +9 V or −9 V. They are used to switch transistors 56, 57, 58, and 59. Five potentiometers, 60, 61, 62, 63, and 64 are adjustable on the control panel. They are labeled "RAMP PSI/G 0-5", "RAMP ONSET 1-5G", "STEP ONSET 1-5G", "STEP PSI 0-5", and "LIMIT PSI 6-11", respectively. Switch 65 is a panel mounted pushbutton "TEST" switch and switch 66 is a toggel switch for inserting a "READY PRESSURE" value. The effects of these controls will be discussed later.

Potentiometers 67 and 68 are balance controls for their associated pressure and acceleration transducers 52 and 51 respectively. The output of pressure transducer 52 is amplified by amplifier 69 and provides a voltage responsive to the ambient pressure exerted on transducer 52 to the summing amplifier 70. Potentiometer 71 provides a gain control of amplifier 69.

Figure 6:
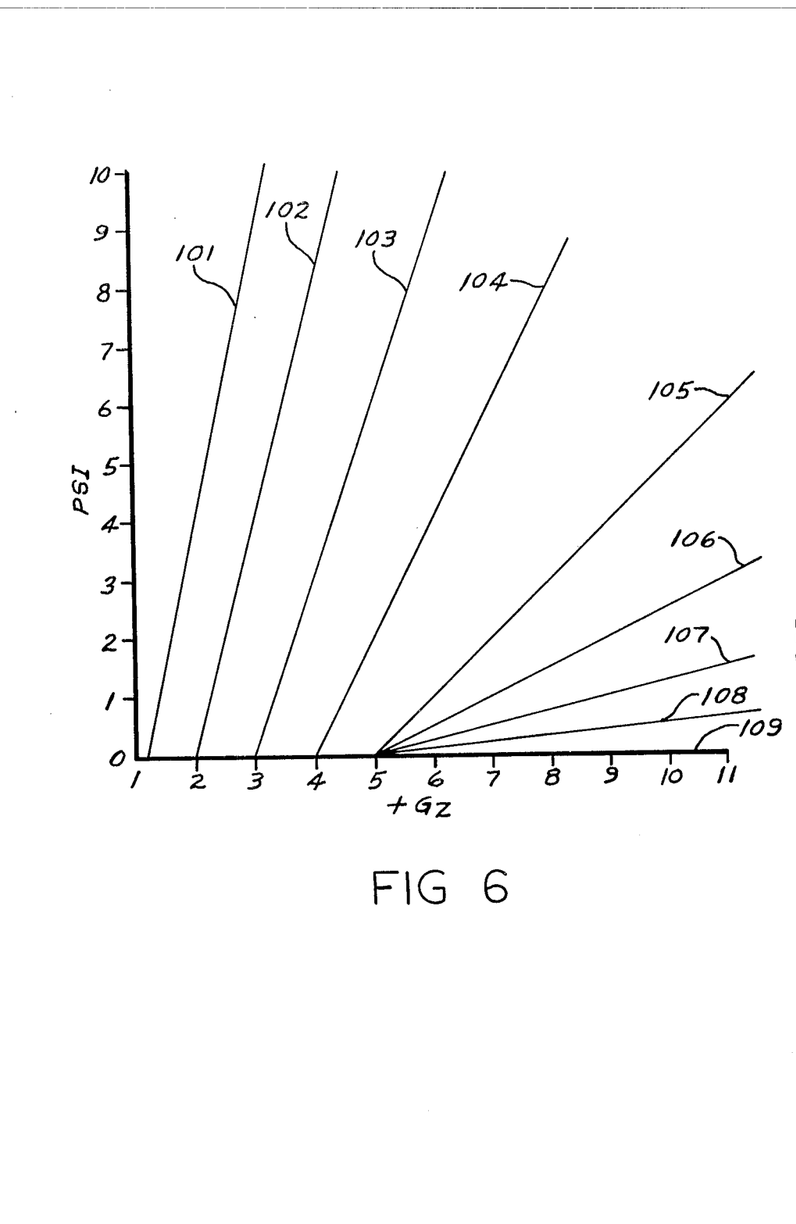
FIG. 6 illustrates graphically typical characteristic response curves of varying ramp rates and ramp onset levels with step onset level and step pressure held at zero.
Figure 7:
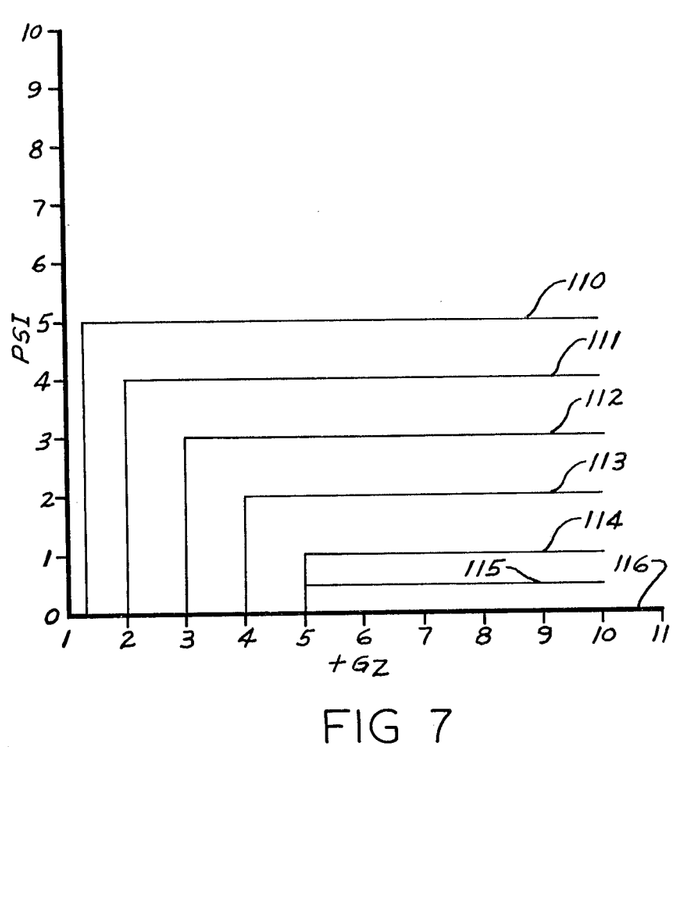
FIG. 7 illustrates graphically typical characteristic response curves with ramp rates and ramp onset levels held at zero with varying step onset levels and step pressures.

The output of accelerometer 51 is amplified by amplifier 72. The gain of which is controlled by potentiometer 73. It is normally set to provide an output of approximately 0.5 V/G (volts per pounds per square inch gage). The output voltage from the accelerometer amplifier is compared with that set by potentiometer 61, the ramp onset level (ROL), in amplifier 74. When the output from amplifier 72 is greater than the ROL the signal is passed through transistor 56 to amplifier 75. The voltage appearing at the source of transistor 56 is the difference between the acceleration voltage and the ROL voltage multiplied by the gain of amplifier 74. This gain is varied from X0 to X5 by adjusting potentiometer 60, (the RAMP PSI/G control). (The effects of varying potentiometers 61 and 60 are illustrated in FIG. 6.) Amplifier 53 compares the acceleration voltage with that set by potentiometer 62, the STEP ONSET LEVEL (SOL), and when the acceleration voltage is greater, the voltage at the drain of transistor 59, as set by potentiometer 63, which represents STEP PRESSURE (SP), is admitted through transistor 59 and resistors 76 to amplifier 75. The effect of varrying SP and SOL is illustrated in FIG. 7. Spring loaded pushbutton "TEST" switch 65 is normally in the position shown. When the switch is actuated to the ground position an acceleration of 1G is compared with a zero set offset level and the valve responds to the step pressure setting on potentiometer 63. It is to be noted that the step pressure must be set at greater than zero for any pressure value to be passed by transistor 59 when the test switch is operated, and that when it is operated a G voltage will activate transistor 59 to pass the step pressure voltage set on potentiometer 63.

Amplifier 75 has a gain of X1 and its output is the total demand ($D_t$) excluding the "READY PRESSURE" input. The $D_t$ signal is applied at the drain of transistor 58 and through resistor 77 to the input of amplifier 55. In amplifier 55 the $D_t$ signal is compared with the signal from potentiometer 64 which is applied through resistor 78 and represents "PRESSURE LIMIT" which typically is asjustable by potentiometer 64 on the control panel from approximately 6 PSI to 11 PSI. When $D_t$ is less than the set pressure limit $P_L$, the signal at the drain of transistor 58 is admitted to amplifier 70 through resistor 79. At the same time the signal at the drain of transistor 57 is blocked. When $D_t$ is greater than $P_L$, amplifier 55 reverses, the signal at transistor 58 is blocked and transistor 57 admits the $P_L$ signal to amplifier 80 through resistor 81 where it is inverted and applied to amplifier 70 through resistor 82. The input at resistor 82 is then a fixed voltage and causes the valve to maintain the selected pressure as long as it is less than $D_t$. When $D_t$ decreases to a point below $P_L$ its signal is again admitted, $P_L$ is blocked and the valve follows $D_t$. The input at resistor 83 is "READY PRESSURE" (RP) and is controlled by operating switch 66. The switch is shown in the drawing in the "OFF" position. When it is moved to "On", the valve sees a demand of approximately 0.2 PSI which just fills a typical anti-G suit volume, but is not uncomfortable to the wearer. It does, however, decrease inflation time significantly. The input at resistor 84 is the tachometer generator signal which serves to damp the response of drive motor 42 and prevent overshoot. The input at resistor 85 is an AC coupled input taken from the motor which aids to reduce oscillation or hunting to an insignificant value.

The output of amplifier 70 drives transistors 88 and 89 through driver transistors 86 and 87 to operate the motor 42 (forward, reverse, and stop) in a conventional manner. Motor 42, tachometer 46, amplifier 70, and motor drive transistors 86 through 89 comprise a conventional feedback servo control system to drive motor 42, actuating, through the gear and cam mechanism, the control rod 47 to move responsive to the electrical input signal at terminal 2 of amplifier 70. Potentiometers 90, 91, 92, 93, 94, 95, and 96 are conventional calibrating means for determining the range of the associated variable panel controls.

Accelerometer 51 is a conventional commercially available unit. An Endevco Model 2262-25± 25 is a suitable unit for use in embodiments of the invention. Likewise, any suitable commercially available pressure transducer 52, such as Gould Statham Model PL 131TC± 15, is a suitable unit for use with the invention. The motor 42 and the motor 46 used as a tachometer generator are normally similar conventional permanent magnet field 12 VDC motors. The Microswitch Model 28 EM 31-ADA-1 is a suitable unit for both applications (i.e., motor and tachometer generator).

Pressure transducer 52 through amplifier 69 provides a signal to summing amplifier 70, through its respective resistor in the summing resistor bank connected to terminal 2, to conventionally pressurize the garment responsive to decreased pressures at high altitudes independently of the pressurization of the garment due to acceleration forces.

FIG. 6 illustrates typical operation of the valve (pounds per square inch suit pressure plotted against gravitational units of force) for various settings of the ROL (Ramp Onset Level) 61 and the RAMP PSI/G 60 controls, with the SOL (Step Onset Level) 62 and the SP (Step Pressure) 63 controls set at zero. The LP (Limit Pressure) 64 is set at 11 psi and the RP (Ready Pressure) switch 66 is off. Curve 101 illustrates the variation in suit pressure vs G with the RAMP PSI/G control set at 5 PSI/G and the ROL set at 0.2 G. For curve 102 the ramp was set at 4 PSI/G and the ROL set at 2G; curve 103 ramp PSI/G set at 3 and ROL at 3 G; curve 104, ramp PSI/G at 2 and ROL at 4 G; curve 105, ramp PSI/G at 1 and ROL at 5 G; curve 106, ramp PSI/G at 0.5 and ROL at 5 G; curve 107, ramp PSI/G at 0.25 and ROL at 5 G; curve 108, ramp PSI/G at 0.1 and ROL at 5 G. With the ramp PSI/G control set at 0.0 there is no buildup of pressure with increases in G and the valve response characteristic may be represented as merely a line 109 on the abscissa.

It should be stated that the foregoing curves and the following illustrative curves were obtained from an operating embodiment of the invention on a centrifuge. A centrifuge of known characteristics provides an ideal means of calibrating embodiments of the invention.

FIG. 7 illustrates typical response characteristic of an embodiment of the invention showing suit pressure PSI plotted against +G units, in which ramp PSI/G control 60 is set at zero and the ROL (Ramp Onset Level) control 61 is also set at zero. The Limit Pressure control 64 is set at 11 psi and the Ready Pressure 66 is off. The Step Onset Level (SOL) control 62 is varied and the Step Pressure (SP) control 63 is varied providing the following characteristics as the gravitational force G is changed. In curve 110, the SP is at 5 psi and the SOL at 0.2 G; curve 111, SP at 4 psi and SOL at 2.0 G; curve 112, SP at 3 psi and SOL at 3.0 G; curve 113, SP at 2 psi and SOL at 4.0 G; curve 114, SP at 1 psi and SOL at 5.0 G; curve 115, SP at 0.4 psi and SOL at 5.0 G; with the SP set at zero the response characteristic is along the abscissa 116.

Figure 8:
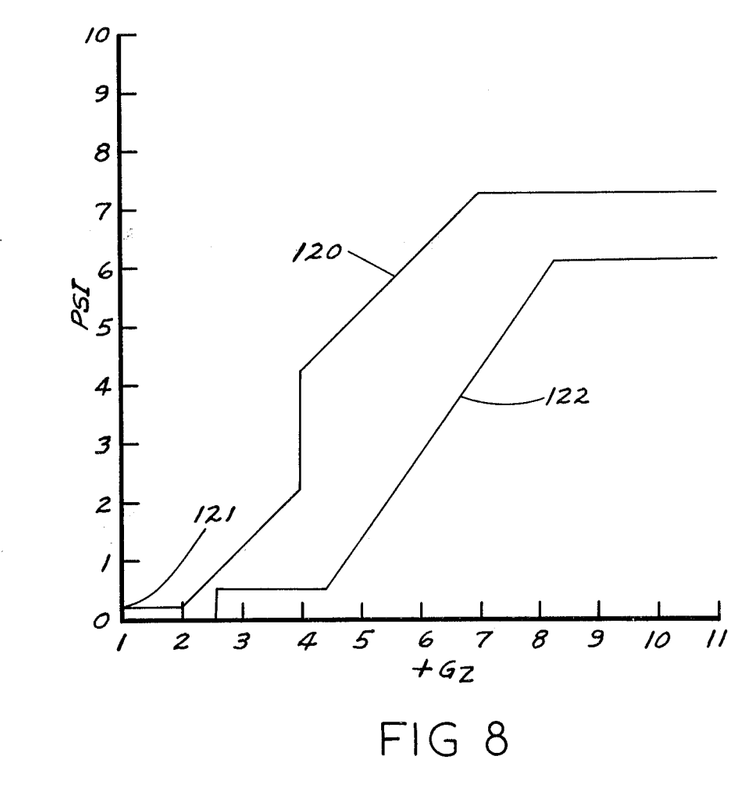
FIG. 8 illustrates graphically two typical complex inflation schedules.

FIG. 8 shows two response characteristics illustrating typical capabilities of embodiments of the invention. For response characteristic 120 the following parameters were set into the equipment. Ramp PSI/G control 60 set at 1 PSI/G, Ramp Onset Level control 61 set at 2.0 G, Step Onset Level control 62 set at 4.0 G, Step Pressure control 63 set at 2.0 psi, Limit Pressure control 64 set at 7.0 psi, and the Ready Pressure switch 66 was on. Various values of +G were then developed on the centrifuge and the corresponding suit pressures obtained. Note, that with the Ready Pressure on, an initial inflation pressure of approximately 0.2 psi is maintained in the suit without any additional G force. This is shown at 121.

The parameters set in the invention for obtaining curve 122 are; Ramp PSI/G, 1.4 PSI/G; Ramp Onset Level, 4.4 G; Step Onset Level, 2.6 G; Step Pressure 0.5 psi; Limit Pressure 6.0 psi; and Ready Pressure off.

While the invention has been described as being particularly suited for multi-profile pressurization of aircrew anti-G garments in high performance fighter aircraft, it is to be understood that it is not so limited. Those skilled in the art will readily apply the invention to those applications where flexible, precise pressure control is desired under varying ambient conditions of pressure and acceleration such as the testing of personnel and equipment on a centrifuge or in an altitude chamber or pressure chamber. Unlike the prior art equipment where the acceleration sensor was physically part of and attached to the valve, embodiments of the invention are not so limited. The sensors do not have to be in or attached to the air line, but may be located at any desired location such as on a crew member, or even exterior the capsule.

I claim:

1. In a pressure control system having a control valve with an air inlet, an air outlet, and a movable pilot port for controlling an air flow, the improvement comprising:
   a. a cover element having an attached control rod, cooperating in movable relationship with the said pilot port;
   b. means including a motor and tachometer servo system for actuating the said control rod in response to a first electrical signal;
   c. an accelerometer having an electrical output signal;
   d. a pressure transducer having an electrical output signal;
   e. means cooperating with the said accelerometer electrical output signal for providing a ramp signal, a ramp onset signal, a step onset signal, a step pressure signal and a limit pressure signal; and
   f. means for combining the said pressure transducer output signal, the said ramp signal, the said ramp onset signal, the said step onset signal, the said step pressure signal and the said limit pressure signal to provide the said first electrical signal.

2. The system as claimed in claim 1 wherein a ready pressure signal is provided and additionally combined in the said first signal for providing an initial valve output pressure.

* * * * *